United States Patent [19]
Filer

[11] 3,992,692
[45] Nov. 16, 1976

[54] PROGRAMMABLE UNDERWATER ACOUSTIC BEACON

[75] Inventor: Armand Jay Filer, Thousand Oaks, Calif.

[73] Assignee: The United States of America as represented by the Secretary of the Navy, Washington, D.C.

[22] Filed: July 23, 1975

[21] Appl. No.: 598,474

[52] U.S. Cl. ............................. 340/5 R; 340/3 A
[51] Int. Cl.$^2$ ...................... G01S 1/72; H04B 11/00
[58] Field of Search .................... 340/3 A, 5 R, 15; 325/115, 116

[56] References Cited
UNITED STATES PATENTS

| | | | |
|---|---|---|---|
| 3,249,913 | 5/1966 | Smyth et al. ................... | 340/3 A X |
| 3,305,824 | 2/1967 | Brooks et al. ..................... | 340/15 |
| 3,342,283 | 9/1967 | Pound ............................ | 340/3 A X |
| 3,673,555 | 6/1972 | Raudsep ........................... | 340/5 R |

*Primary Examiner*—Richard A. Farley
*Attorney, Agent, or Firm*—Richard S. Sciascia; Joseph M. St.Amand; William W. Cochran, II

[57] ABSTRACT

A self-contained acoustic beacon activated by a seawater switch for providing an independent method of locating and recovering a floating or submerged recoverable target. The device provides an ideal operating life for target recovery of about 36 hours as well as providing an extensive underwater range. The device also provides stable frequency operation without a crystal-controlled oscillator over a wide range of source voltages allowing use of inexpensive batteries as a voltage supply source. Additionally, the signature or output signal code of the device can be changed simply and quickly providing positive identification of the acoustic beacon and lengthened operating life span.

12 Claims, 3 Drawing Figures

PROGRAMMABLE UNDERWATER ACOUSTIC BEACON

BACKGROUND OF THE INVENTION

The conventional method of locating a target which has been downed is by homing on a radio frequency beacon which emits a signal on any one of a number of frequencies reserved for that purpose. The radio frequency (RF) beacon normally obtains its power for operation from the target's own battery supply and radiates a signal from the target's existing telemetry antenna, which is switched to the locator beacon's circuitry upon application of the target's recovery system power.

A major disadvantage of the conventional system is that upon failure of the target's power supply, the RF recovery beacon will be without power to provide a homing signal. Since the RF beacon draws its battery current subsequent to the operation of the target's control functions, there is a high probability that the battery supply of the target will be unable to provide enough energy to properly operate the RF beacon. Furthermore, if the target should land upside down or if the target floats low in the water, the beacon antenna can be easily shorted such that it would not operate.

Underwater acoustic beacons have been manufactured which overcome many of the disadvantages and limitations of the RF beacons. However, acoustic beacons which are now commercially available are generally unsuitable as target recovery devices since they are normally not self-contained, are expensive to manufacture, in most cases only provide two frequencies of operation with only a single code or signature for identification purposes, require expensive crystal-controlled oscillators for stable frequency control, and are generally limited in range as well as requiring expensive battery power sources.

SUMMARY OF THE INVENTION

The present invention overcomes the disadvantages and limitations of the prior art by providing an improved underwater acoustic beacon. The present invention utilizes a piezo-ceramic crystal which is driven at its natural resonance frequency to provide maximum range of the underwater acoustic beacon. An integrated circuit oscillator is also utilized in the present invention to provide stable frequency control over a wide range of source voltages, thereby eliminating the necessity of an expensive crystal-controlled oscillator. An integrated circuit pulse generator is also used in the device to provide a programmable frequency range as well as a programmable frequency pulse width. As such, the signature or output code of the device can easily be changed for positive identification of the beacon. By using integrated circuitry in the device, it can be manufactured quickly and inexpensively and is compatible with cheaper replaceable carbon-type batteries without sacrificing frequency stability or overall reliability.

It is therefore an object of the present invention to provide an improved underwater acoustic beacon.

It is also an object of the present invention to provide a completely self-contained underwater acoustic beacon.

Another object of the present invention is to provide an acoustic beacon which is reliable in operation and inexpensive to manufacture.

Another object of the invention is to provide an acoustic beacon having a signature which can be changed simply and quickly.

Another object of the invention is to provide an acoustic beacon which has a programmable frequency range which can be changed simply and quickly.

Another object of the present invention is to provide an acoustic beacon which has a stable frequency output over a wide range of supply voltages.

Other objects and further scope of applicability of the present invention will become apparent from the detailed description given hereinafter. The detailed description indicates the preferred embodiments of the ivention and is given by way of illustration only since various changes and modifications within the spirit and scope of the invention will become apparent to those skilled in the art from this detailed description. It should be understood that the foregoing abstract of the disclosure is for the purpose of providing a non-legal brief statement to serve as a search scanning tool for scientists, engineers and researchers, and is not intended to limit the scope of the invention as disclosed herein, nor is it intended that it should be used in interpreting or in any way limiting the scope or fair meaning of the appended claims.

DETAILED DESCRIPTION OF THE PREFERRED EMBODIMENTS

Figure 1:
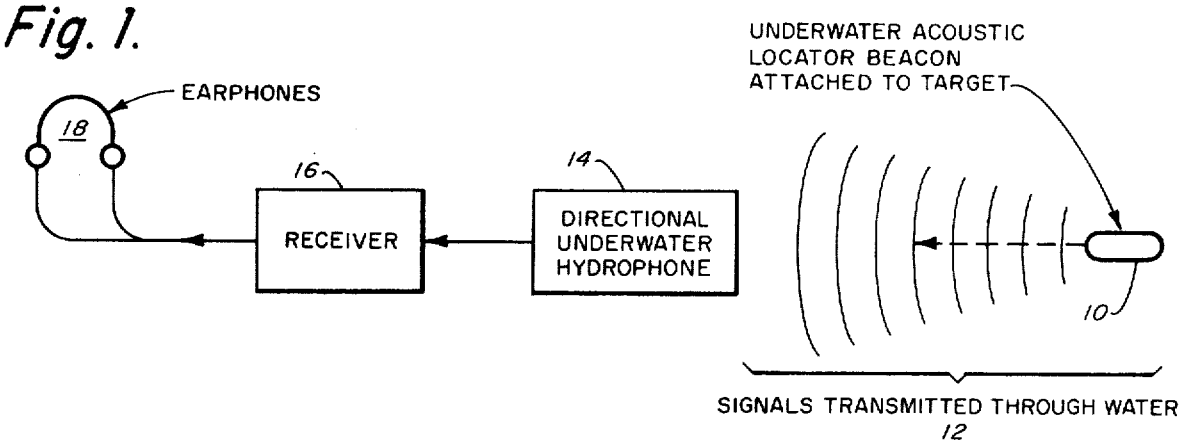
FIG. 1 is a schematic drawing illustrating the operation of the preferred embodiment of the invention.

FIG. 1 is a schematic illustration of the overall system operation of the preferred embodiment. The underwater acoustic locator beacon 10 is attached to a target and transmits acoustic signals 12 through a seawater environment. The target, is one which is recoverable and which may have been fired upon but remains substantially undamaged and has fallen into the ocean. The acoustic signals 12 are transmitted over a 360° radius and are detected by directional underwater hydrophone 14, normally located upon the target recovery ship. The intensity of the detected signal by hydrophone 14 varies with its particular direction. Therefore, the direction to the target can be determined from any location within the range of the acoustic locator beacon by proceeding on a course in line with the directional underwater hydrophone 14. When it is positioned in a direction to produce a maximum output intensity signal, the output intensity of hydrophone 14 is determined by receiver 16 and earphones 18. Receiver 16 functions to demodulate the received hydrophone signal to audio frequencies. It additionally functions to amplify and impedance adjust its output signal for proper matching to earphones 18.

Figure 2:
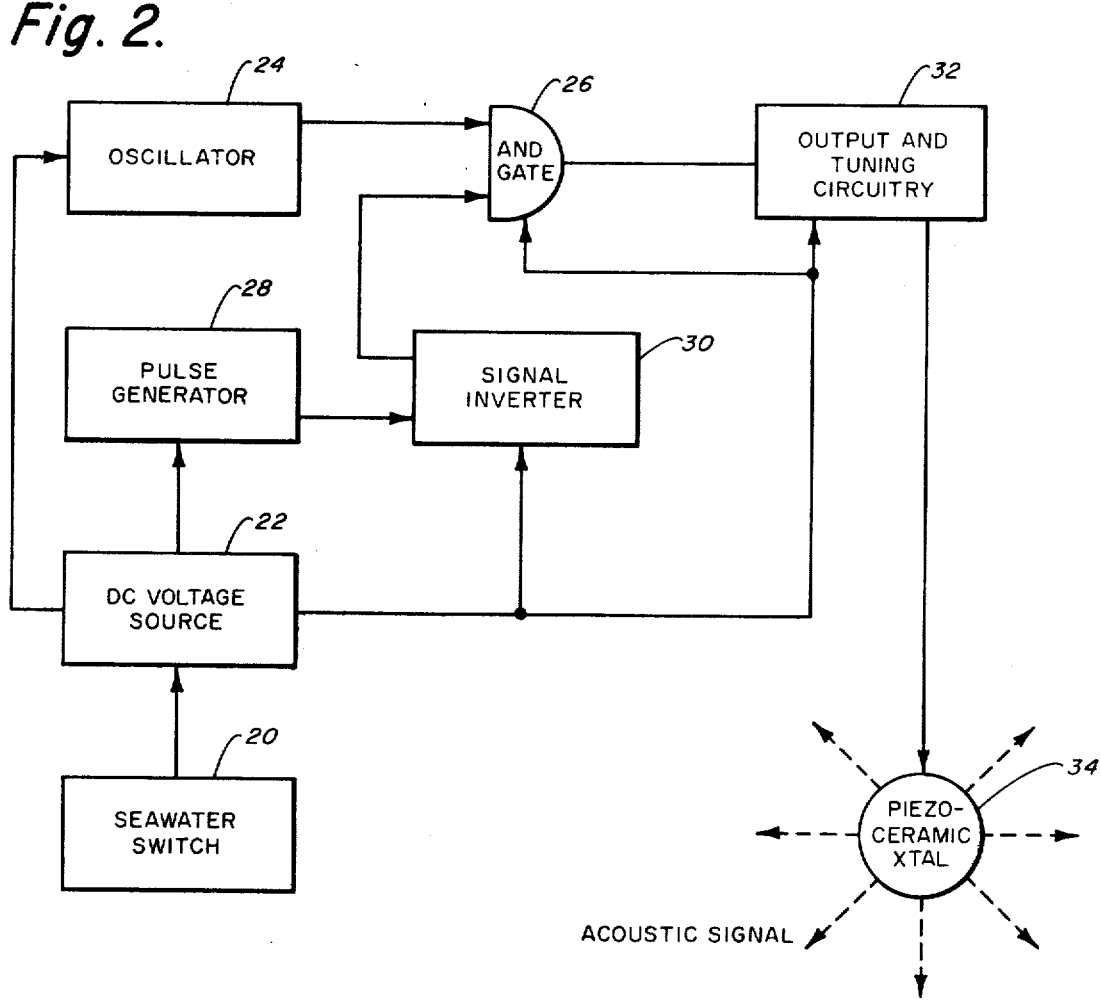
FIG. 2 is a block diagram of the preferred embodiment.

FIG. 2 is a block diagram of the preferred embodiment of the invention. Seawater switch 20 is activated by seawater conductivity upon splashdown of the target. The switch activates the d.c. voltage source 22, which in turn activates oscillator 24, "And" gate 26, pulse generator 28, signal inverter 30, and output tuning circuitry 32. Upon activation, oscillator 24 produces a signal having a preselected output frequency which matches the natural resonant frequency of the piezo-ceramic crystal 34 to provide maximum electromechanical conversion efficiency. Pulse generator 28 produces an output signal which has a programmable pulse duration and pulse repetition rate. The pulse generator output signal is inverted by signal inverter 30 and applied to "And" gate 26 along with the output of oscillator 24. The application of simultaneous positive signals at the inputs of "And" gate 26 causes it to conduct. Therefore, by adjusting the programmable pulse generator 28, bursts of energy from oscillator 24 can be applied to the piezo-ceramic crystal 34 at its natural resonance frequency via output tuning circuitry 32 in accordance with the selected pulse duration and pulse frequency rate of programmable pulse generator 28. Output tuning circuitry 32 provides proper impedance matching to drive the piezo-ceramic crystal 34 in its most efficient mode.

Figure 3:
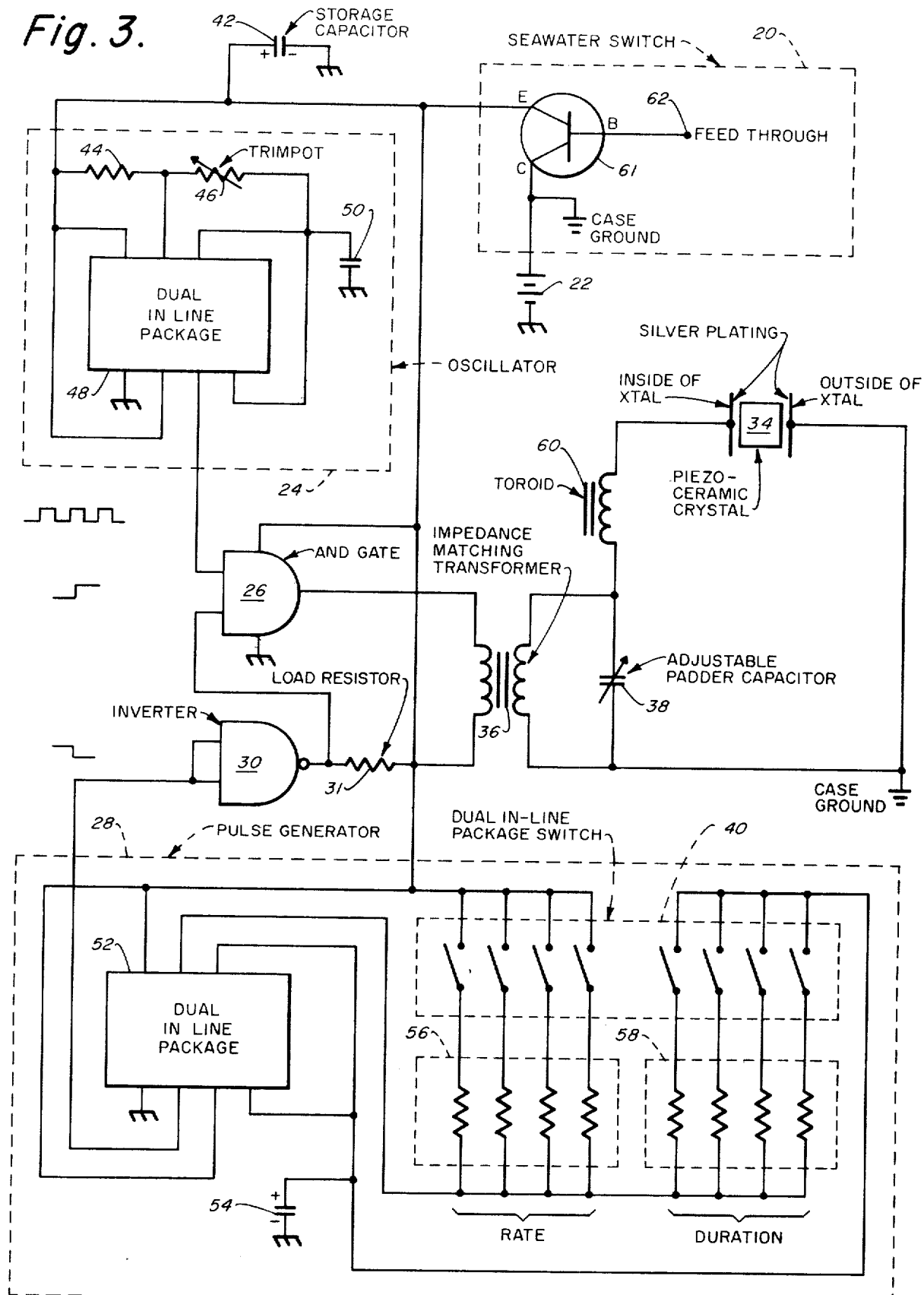
FIG. 3 is a schematic diagram of the preferred embodiment.

FIG. 3 is a schematic diagram of the preferred embodiment of the invention. Oscillator 24 consists of a monolithic, linear, dual-in-line integrated circuit 48, tuning resistors 44 and 46, and tuning capacitor 50. Resistors 44 and 46 and capacitor 50 determine the oscillator frequency. Trimpot 46 provides frequency fine tuning of the oscillator to match variations in the natural resonance frequency of the particular piezo-ceramic crystal used in the device. Pulse generator 28 additionally uses a monolithic, linear, dual-in-line package integrated circuit 52, similar to the integrated circuit 48 used in oscillator 24. A resistance and a capacitance is also used in the pulse generator 28, as in the oscillator 24, to determine the operating frequency of the pulse generator. The capacitance is provided by capacitor 54 while the resistance is provided by resistors 56 and 58. Resistors 56 are a series of resistors connected in parallel to a dual-in-line package switch 40. By conrolling the operation of the switches of the dual-in-line package switch, the effect of the combined resistance of resistors 56 can be changed in a series of discreet steps, thereby providing a series of discreet output frequencies in the pulse generator 28. Similarly, resistors 58 provide a programmable series of discreet pulse widths of the output signal of the pulse generator 28.

Seawater switch 20 acts as a means for "turning on" the beacon when the beacon is submerged in water and "turning off" the beacon when it is removed from the water. It consists of a transistor 61, a feedthrough 62, and a case ground. When the beacon is submerged in salt water or other conducting medium, the center terminal 62 is electrically connected to the case ground, turning on transistor 61, thereby activating the remaining circuitry, as shown in FIG. 3. Storage capacitor 42 stores battery energy and releases it as the capacity of the battery 22 is utilized, thereby helping to conserve battery power during peak loads when crystals 34 is being pushed.

"Nand" gate 30 acts as an inverter for inverting the output of pulse generator 28. The inverted output is then applied to "And" gate 26, as is the ouput of oscillator 24. The continuous output of oscillator 24 is gated to the output of "And" gate 26 whenever an output from pulse generator 28 is present. "And" gate 26 therefore acts to gate bursts of the acoustic signal to be applied to the crystal.

Impedance matching transformer 36 is used to properly match the impedance of the circuit to the crystal 34. The transformer is used to provide a step up of pulse voltage from a low output provided by "And" gate 26 by applying higher voltages to piezoelectric crystal 34. The crystal deforms, with an amplitude of deformation proportional to the applied voltage. A tank circuit, consisting of toroid 60 and adjustable padder capacitor 38 is necessary to cause the crystal 34 to resonate. Both the inside and the outside of the crystal are silver-plated for polarization which allows the voltage generated by the circuit to be applied uniformly across the entire surface area of the crystal.

A number of advantages result from the design of the preferred embodiment of the invention. Since the device uses a seawater switch, once attached to the target its operation is all automatic. The device is additionally self-contained and does not require outside power sources which may prove to be unreliable. Furthermore, the device is inexpensive to manufacture because of the simplicity of its design; it provides a signature or output code which can be changed simply and quickly; it can readily be tuned to provide maximum output range; and has excellent frequency stability over a wide range of supply voltages without reliance on expensive, crystal-controlled oscillators. The programmable pulse width and pulse rate not only provide an underwater signature for identification purposes but also act to lengthen or shorten, as desired, the operating life of the beacon by pulsing the beacon circuitry so that it is off for any predetermined portion of time during its operation. The adjustability of the system provided by trimpot 46 and adjustable padder capacitor 38, in addition, allows use of various piezo-ceramic crystals having different heights and therefore different natural resonance frequencies. The stability of oscillator 24 also allows use of less expensive carbon zinc-type batteries as a power source to thereby further reduce the cost and manufacture.

Therefore, many modifications and embodiments of the specific invention will readily come to mind to one skilled in the art, having the benefit of the teachings presented in the foregoing description and the accompanying drawings of the subject invention and, hence, it is to be understood that the invention is not limited thereto and that such modifications, etc., are intended to be included within the scope of the appended claims.

What is claimed is:

1. A self contained acoustic beacon for providing an independent method of locating a floating or submerged recoverable target comprising:
   a. means for producing an electrical signal;
   b. automatic switch means for activating said means for producing an electrical signal;
   c. oscillator means for producing an acoustic frequency electrical signal;
   d. programmable pulse generating means for producing a signature gating signal which can be discretely varied in both duration and rate;
   e. means for gating said acoustic frequency electrical signal in accordance with said signature gating signal; and
   f. transducer means for transmitting an acoustic signal derived from said acoustic frequency electrical signal.

2. The acoustic beacon of claim 1 wherein said automatic switch means comprises a seawater switch which is activated by the conductivity of said seawater.

3. The acoustic beacon of claim 1 wherein said means for gating comprises an "And" gate.

4. The acoustic beacon of claim 1 wherein said oscillator means comprises a monolithic linear dual-in-line integrated circuit which has high frequency stability over a wide range of supply voltages.

5. The acoustic beacon of claim 1 wherein said programmable pulse generating means comprises:
   a. a monolithic, linear, integrated circuit;
   b. a first set of resistors connected in parallel;
   c. a second set of resistors connected in parallel;
   d. a first set of switches connected to said first set of resistors;
   e. a second set of switches connected to said second set of resistors;
   f. wherein said first set of switches can be programmed to control th pulse rate of said programmable pulse generator and said second set of switches can be programmed to control the pulse duration of said programmable pulse generator to produce a distinctive signature for said beacon to aid in its positive identification and to alter the life span of said means for producing an electrical signal.

6. The acoustic beacon of claim 5 wherein said automatic switch means comprises a seawater switch which is activated by the conductivity of said seawater.

7. The acoustic beacon of claim 5 wherein said means for gating comprises an "And" gate.

8. The acoustic beacon of claim 5 wherein said oscillator means comprises a monolithic, linear, integrated circuit which has high frequency stability over a wide range of supply voltages.

9. A self-contained acoustic beacon for producing a programmable output signature comprising:
   a. means for producing an audio frequency electrical signal which has high frequency stability over a wide range of supply voltages;
   b. programmable pulse generating means for producing a series of signature pulses which can be varied in both duration and rate;
   c. means for selectively gating said audio frequency electrical signal in accordance with said series of said signature pulses to an output transducer;
   d. automatic switch means for applying said supply voltages to said acoustic beacon upon submersion of said acoustic beacon in a seawater emvironment.

10. The acoustic beacon of claim 9 wherein said automatic switch means comprises a seawater switch which is activated by the conductivity of said seawater.

11. The acoustic beacon of claim 9 wherein said means for selectively gating comprises and "And" gate.

12. The acoustic beacon of claim 9 wherein said programmable pulse generating means comprises:
   a. a monolithic, linear, integrated circuit;
   b. a first set of resistors connected in parallel;
   c. a second set of resistors connected in parallel;
   d. a first set of switches connected to said first set of resistors;
   e. a second set of switches connected to said second set of resistors;
   f. wherein said first set of switches can be programmed to control the pulse rate of said programmable pulse generator and said second set of switches can be programmed to control the pulse duration of said programmable pulse generator to produce a distinctive signature for said beacon to aid in its positive identification and to lengthen the life span of said means for producing an electrical signal.

* * * * *